Jan. 8, 1952     O. SIMMER     2,581,817

PACKING RING

Filed Jan. 16, 1948

INVENTOR.
Otto Simmer
BY Robert E. Burns
ATTORNEY

Patented Jan. 8, 1952

2,581,817

UNITED STATES PATENT OFFICE 2,581,817

PACKING RING

Otto Simmer, Mondsee, Austria

Application January 16, 1948, Serial No. 2,711
In Austria July 2, 1946

4 Claims. (Cl. 288—3)

This invention relates to a sealing device for preventing the escape of lubricant and the entrance of dust, for use in connection with rotary and reciprocating machine elements, and is of the type comprising an annular housing, a sleeve firmly inserted into the same, and a sealing inturned flange which is made from a piece of rubber which, under the elastic pressure of a coil spring stretched around it, tightly encloses in a ring, the machine element to be sealed.

In the known devices of this type, the coil spring is placed in an annular groove on the sealing flange, from which position it easily jumps out where the device is unnecessarily jolted, thus eliminating the sealing effect. It has been suggested to overcome this defect by providing stops at the housing.

Devices are also known in which the screw-collar spring is held on the packing lip by several retaining means, arranged at intervals from one another, bridging the screw spring in cross section, and held in such a way that the packing lip forms, with the screw-collar spring, an indissoluble unit. The screw-collar spring remains completely unimpeded in its tension freedom, and through this imparts an increased flexibility to the packing lip. However, these retaining means, consisting of steel springs require an inordinately complicated mounting, because they must be clamped tightly together with the packing cuff in the annular housing, in the form of a wreath.

According to the present invention, the retaining means are formed of rubber integral with the packing lip itself. By this construction the disadvantages of the devices of the prior art are eliminated.

The retaining means can be made of the same material as the sealing flange, either separately or as an integral part thereof. If desired, the retaining means can be made of metallic bows which are anchored in the sealing flange, with equally good results.

In the drawings, which show several embodiments of the invention by way of example, Figs. 1 and 2 show an embodiment of the sealing device in a fragmentary longitudinal section, having differently shaped seatings for the annular coil spring, the machine element to be sealed being represented by broken lines in Fig. 2.

Figure 1:
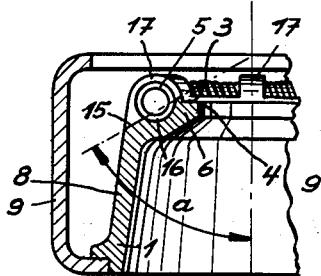

The sealing device consists of a stationary, unipartite, annular housing 9 and the sealing rubber sleeve 1, which is vulcanized into the housing and forms a cylindrical or slightly conical jacket. The sealing sleeve 1 carries at its free end a sealing inturned flange 6, which tightly encloses in a ring the machine element to be sealed, in this case the shaft 10, and is, in this instance made integral with the sealing sleeve 1, of one piece of rubber. The sealing flange 6 has an outside face 3, extending in its radial plane and having a wiping edge 4 resting under elastic pressure against the machine element 10. This outer face 3 of the sealing flange 6 is connected with the outer surface 8 of the sealing sleeve 1 by an annular surface 15, which is beveled at the angle $a$, and has an annular groove 16 of round cross-section, which is sunk into said face and serves as the seal for the coil spring 5, and acts as a tightening element.

Figure 2:
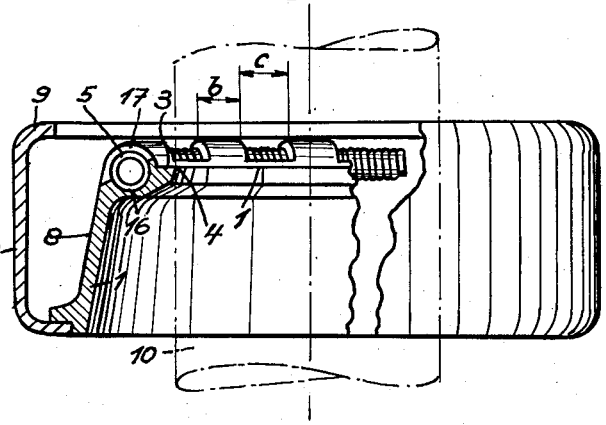

In the embodiment shown in Figure 1, the annular groove 16 is formed shallow, in order to give the packing lip a profile which increases its resistance. The spring seat or ring groove 16 can also be so deep that, as shown in Figure 2, it spans at least half the ring spring in cross section. In that case the profile of the packing lip is far weaker but also more elastic. However, in both the embodiments shown in Figs. 1 and 2, consideration has been given, so that the center of the cross section of the annular groove lies in the plane of the outer face 3 of the sealing flange 6. This renders effective the tightening pressure of the coil spring 5 in the plane of the sealing edge of the sealing flange.

The coil spring 5 is retained on its seat 16 by retaining bows 17. These bows are constructed either of the same material as the sealing flange 6 and are made integral therewith, or may be made of metal and worked into the sealing flange, as desired. In the case where the bows are made of the same material as the sealing flange 6, the coil spring 5 is inserted into the pressure mold when the sealing ring is being formed.

Figure 3:
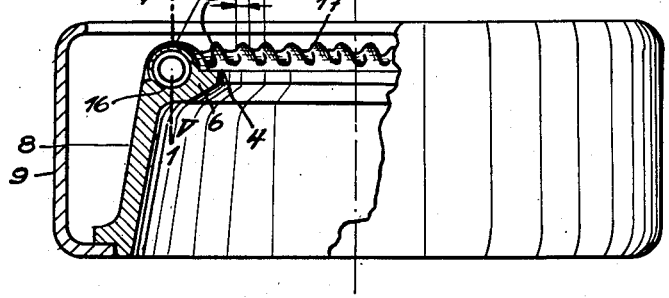
Fig. 3 is a fragmentary longitudinal section through a sealing device with helical retaining bows, between which are inserted rust-preventing rubber coatings.

The width $b$ of the retaining bows 17, as well as the distances $c$, can be adapted to various requirements with regard to longitudinal section. The distances $c$ can also be bridged, as shown in Fig. 3, by thin rubber coatings serving as rust-preventing means, which do not restrain the spring threads in their elastic movements. These coatings are made jointly with the retaining bows 17 in one piece with the sealing flange.

Figure 4:
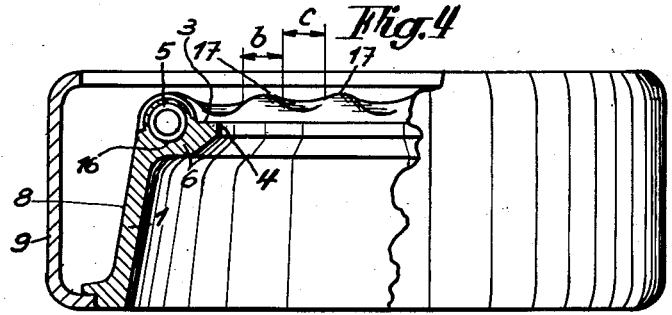
Fig. 4 shows a sealing device, in fragmentary longitudinal section, with undulatory retaining bows provided with and connected by rust-preventing rubber coatings.
Figure 5:
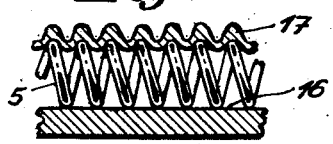
Fig. 5 shows a section taken on the line V—V of Fig. 3, along the axis of the coil spring.

The retaining bows 17 and the rust-preventing coatings can, if desired, be made as shown in Figs. 3 and 4, in the shape of circular undulations, the waves of which can be either short, as shown in Fig. 3, or stretched out as shown in Fig. 4, depending upon whether the wave crests serving as retainers 17 are arranged near to or away from each other. Fig. 5 illustrates the approximate dimensional relations between the wave crests and the wave troughs, whereby the elasticity of the coil spring is unrestrained despite its being enclosed. Furthermore, the sealing element as a whole is greatly enhanced in its ability to cling to the shaft to be sealed.

What I claim is:

1. In a liquid and dust proof seal for rotary and axially displaceable machine elements, comprising an annular housing fixed to the stationary machine part, a sleeve of elastic material fixed in said housing and provided with an annular inturned sealing flange which tightly encloses the machine element to be sealed, an annular groove of round cross section provided on an outside face of said sealing flange, a stretched spring accommodated in said groove and acting to press said sealing flange into engagement with the element to be sealed, a plurality of retaining means bridging said coil spring at spaced intervals and securing it to its seat, a bevelled surface being provided between the outside face of said sealing flange and the outside surface of said sleeve, said annular groove being provided on said bevelled surface, the central cross section of said groove lying in the plane of said bevelled surface.

2. In a liquid and dust proof seal for rotary and axially displaceable machine elements, comprising an annular housing fixed to the stationary machine part, a sleeve of elastic material fixed in said housing and provided with an annular inturned sealing flange which tightly encloses the machine element to be sealed, an annular groove of round cross section provided on an outside face of said sealing flange, a stretched spring accommodated in said groove and acting to press said sealing flange into engagement with the element to be sealed, a rubber coating coextensive with the coil spring and made in one piece with said sealing flange, said rubber coating having elevations and depressions corresponding to the convolutions of the coil, the wave crests forming retaining bows and the wave troughs forming thin connecting portions, said rubber coating embracing the coil spring and being adapted to follow its stretching and shrinking movements.

3. In a liquid and dust seal for rotary and axially displaceable machine elements, comprising an annular housing fixed to the stationary machine part, a sleeve of elastic material fixed in said housing and provided with a sealing inturned flange which tightly encloses in a ring, under the pressure of a coil spring stretched around said flange, the machine element to be sealed and an annular groove of round cross section provided on the outside face of said sealing flange and accommodating said spring, several retaining bows bridging said coil spring at several places, made from the material of the sealing flange and spaced from each other.

4. In a liquid and dust seal for rotary and axially displaceable machine elements, comprising an annular housing fixed to the stationary machine part, a sleeve of elastic material fixed in said housing and provided with a sealing inturned flange which tightly encloses in a ring, under the pressure of a coil spring stretched around said flange, the machine element to be sealed, and an annular groove of round cross section provided on the outside face of said sealing flange and accommodating said spring, several retaining means bridging said coil spring at several places and securing it to its seat, a bevelled surface being provided between the outside face of said sealing flange and the outside surface of said sleeve, said annular groove being provided on said bevelled surface, the center of cross section of said groove lying in the plane of said bevelled surface.

OTTO SIMMER.

REFERENCES CITED

The following references are of record in the file of this patent:

UNITED STATES PATENTS

| Number | Name | Date |
| --- | --- | --- |
| 1,819,871 | Clark | Aug. 18, 1931 |
| 2,005,089 | Krebs | June 18, 1935 |
| 2,089,461 | Winter | Aug. 10, 1937 |
| 2,145,928 | Heinze et al. | Feb. 9, 1939 |
| 2,249,141 | Johnson | July 15, 1941 |
| 2,264,970 | Giles | Dec. 2, 1941 |
| 2,316,713 | Procter | Apr. 13, 1943 |